United States Patent
Mosko et al.

(10) Patent No.: US 9,407,549 B2
(45) Date of Patent: Aug. 2, 2016

(54) SYSTEM AND METHOD FOR HASH-BASED FORWARDING OF PACKETS WITH HIERARCHICALLY STRUCTURED VARIABLE-LENGTH IDENTIFIERS

(71) Applicant: Palo Alto Research Center Incorporated, Palo Alto, CA (US)

(72) Inventors: Marc E. Mosko, Santa Cruz, CA (US); Michael F. Plass, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 61 days.

(21) Appl. No.: 14/065,691

(22) Filed: Oct. 29, 2013

(65) Prior Publication Data

US 2015/0117449 A1    Apr. 30, 2015

(51) Int. Cl.
*H04L 12/28*    (2006.01)
*H04L 12/743*    (2013.01)
*H04L 12/725*    (2013.01)
*H04L 29/08*    (2006.01)

(52) U.S. Cl.
CPC .......... *H04L 45/7453* (2013.01); *H04L 45/306* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 817,441 A | 4/1906 | Niesz | |
| 4,309,569 A | 1/1982 | Merkle | |
| 4,921,898 A | 5/1990 | Lenney | |
| 5,070,134 A | 12/1991 | Oyamada | |
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1 | 5/2001 | Downs | |
| 6,233,646 B1 | 5/2001 | Hahm | |
| 6,332,158 B1 | 12/2001 | Risley | |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Willie J Daniel, Jr.
(74) *Attorney, Agent, or Firm* — Shun Yao; Park, Vaughan, Fleming & Dowler LLP

(57) ABSTRACT

One embodiment of the present invention provides a system for forwarding packets with hierarchically structured variable-length identifiers (HSVLIs). During operation, the system receiving a packet with an HSVLI. The packet includes a first value and a second value. The first value uniquely represents an interest corresponding to the HSVLI. The second value is derived based on at least a subset of the HSVLI components. The system then makes a forwarding decision for the packet based on the first hash value and second hash value.

24 Claims, 6 Drawing Sheets

(56) References Cited

U.S. PATENT DOCUMENTS

| | | |
|---|---|---|
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |

(56) References Cited

U.S. PATENT DOCUMENTS

| | | |
|---|---|---|
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1* | 8/2010 | Jacobson et al. ............... 370/392 |
| 2010/0195654 A1* | 8/2010 | Jacobson et al. ............... 370/392 |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1* | 4/2011 | Jacobson et al. ............... 370/392 |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |

(56) References Cited

U.S. PATENT DOCUMENTS

| | | |
|---|---|---|
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis ............................ 709/204 |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

(56) References Cited

OTHER PUBLICATIONS

D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA—Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.

(56) References Cited

OTHER PUBLICATIONS

Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Zahariadis, Theodore, et al. "Trust management in wireless sensor networks." European Transactions on Telecommunications 21.4 (2010): 386-395.

(56) References Cited

OTHER PUBLICATIONS

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digital Rights Management using Broadcast Encryption. Proceedings of the IEEE 92.6 (2004).

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

RTMP (2009). Available online at http://wwwimages.adobe.com/www.adobe.com/content/dam/Adobe/en/devnet/rtmp/ pdf/rtmp specification 1.0.pdf.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

SYSTEM AND METHOD FOR HASH-BASED FORWARDING OF PACKETS WITH HIERARCHICALLY STRUCTURED VARIABLE-LENGTH IDENTIFIERS

RELATED APPLICATION

The subject matter of this application is related to the subject matter in the following applications:

U.S. patent application Ser. No. 12/565,005, now U.S. patent Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/638,478, now U.S. patent Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, now Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009; the disclosures of which are incorporated by reference in their entirety.

BACKGROUND

1. Field

The present disclosure relates generally to facilitating communication over a data network. More specifically, the present disclosure relates to a system and method for facilitating hash-based forwarding of packets with hierarchically structured variable-length identifiers.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively inadequate for meeting the ever-changing network demands.

Recently, content centric network (CCN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with meta-data describing or augmenting the piece of content with information such as authentication data, creation date, content owner, etc.

In CCN, content objects and interests are identified by their names, which is typically a hierarchically structured variable-length identifier (HSVLI). Because these names have variable lengths, it is difficult to forward packets with HSVLIs at line speed with high throughput.

SUMMARY

One embodiment of the present invention provides a system for forwarding packets with hierarchically structured variable-length identifiers (HSVLIs). During operation, the system receiving a packet with an HSVLI. The packet includes a first value and a second value. The first value uniquely represents an interest corresponding to the HSVLI. The second value is derived based on at least a subset of the HSVLI components. The system then makes a forwarding decision for the packet based on the first hash value and second hash value.

In a variation on this embodiment, the packet is an interest in a piece of content corresponding to the HSVLI. The first value is a hash derived based on the entire HSVLI and optionally additional information in the packet. The second value is a hash derived on the subset of the HSVLI components. The system updates the second value based on a longer prefix match for the HSVLI.

In a variation on this embodiment, the packet contains a content object in response to an interest in the content.

In a variation on this embodiment, the system maintains a pending interest table, wherein a respective entry in the pending interest table indicates a pending interest associated with the first value and optionally the second value.

In a variation on this embodiment, the system maintains a forwarding information base, wherein a respective entry in the forwarding information base indicates forwarding information for a packet that contains a particular second value.

In a further variation, the entry in the forwarding information base further indicates that a longer prefix match exists for the HSVLI.

In a variation on this embodiment, the packet is an interest in the piece of content. In addition, the system searches a local content store for content corresponding to the interest based on the first value and optionally the second value.

In a variation on this embodiment, the packet contains a content object in response to an interest in the content. The system further updates the second hash value for the packet based on a second hash value of corresponding interest packet that is previously received.

BRIEF DESCRIPTION OF THE FIGURES

In the figures, like reference numerals refer to the same figure elements.

DETAILED DESCRIPTION

Overview

Figure 1:
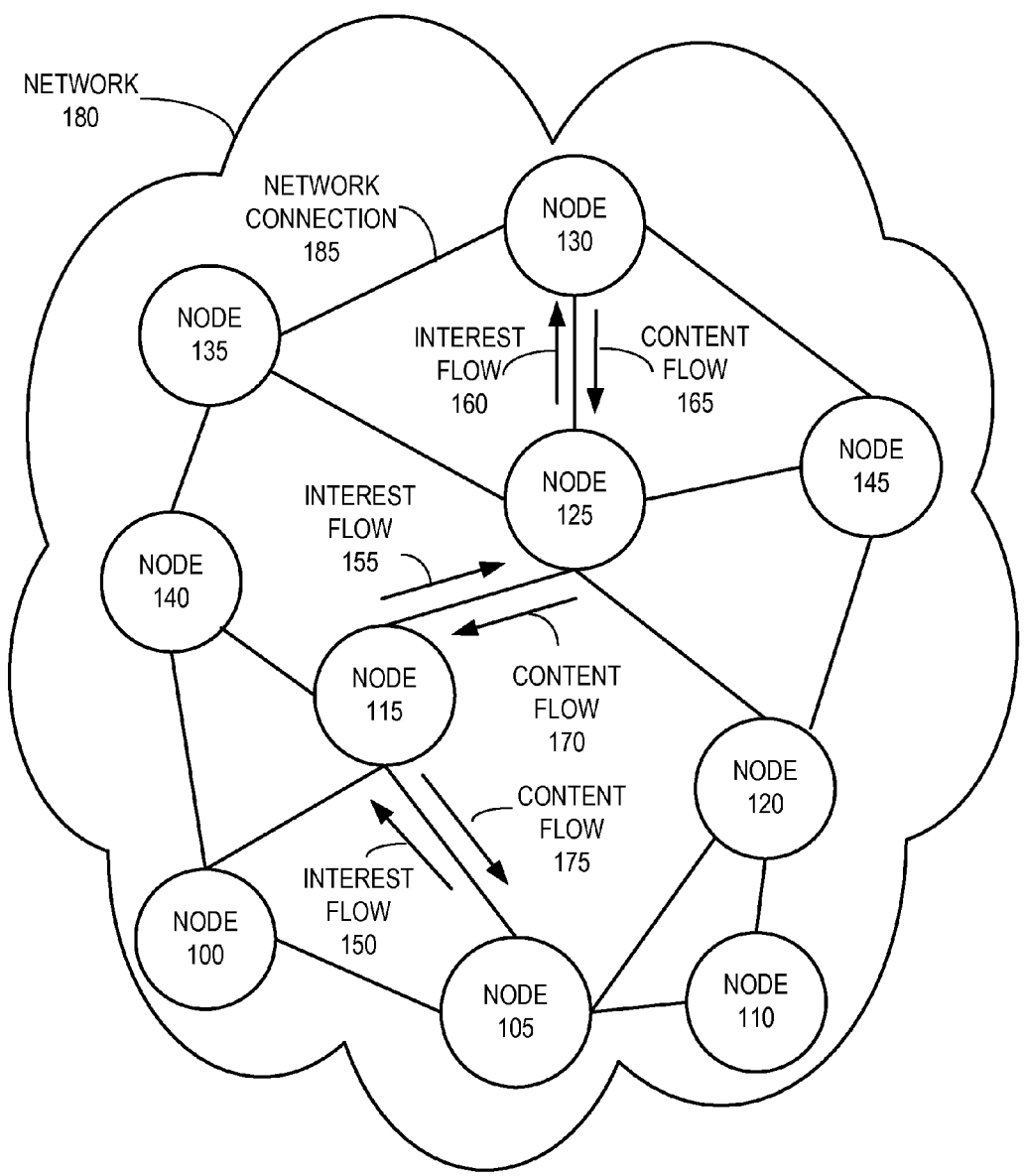
FIG. 1 illustrates an exemplary network where packets have hierarchically structured variable-length identifiers (HSVLIs) in accordance with an embodiment.

Embodiments of the present invention provide a system and method for using fixed size, flat byte strings to forward CCN packets with Hierarchically Structured Variable Length Identifiers (HSVLIs), thus simplifying the work done at a packet forwarder. A first byte string, referred to as the Similarity Hash (SH), represents the query in an Interest. The Similarity Hash remains invariant as a packet moves through the network. A second byte string, called the Forwarding Hash (FH), represents the longest matching prefix in the routing tables in various forwarding devices (e.g., routers, switches, etc.) along a data path that matches the Interest name. The Forwarding Hash may change hop-by-hop if the underlying routing tables change, such that it always represents the best match at the previous hop. A Content Object, sent in response to an SH/FH Interest, carries the SH/FH header along the return path so the Content Object may be forwarded along the proper path.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple interests for the same name, it may aggregate those interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation are not limited to such):

"HSVLI": Hierarchically structured variable length identifier, also called a Name. It is an ordered list of Name Components, which may be variable length octet strings. In human-readable form, it can represented in a format such as ccnx:/path/part. There is not a host or query string. As mentioned above, HSVLIs refer to content, and it is desirable that they be able to represent organizational structures for content and at least partially meaningful to humans. An individual component of a HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs.

For example, an HSVLI indicating an interest in "/parc/home/bob" will match both "/parc/home/bob/test.txt" and "/parc/home/bob/bar.txt." The longest match, in terms of the number of name components, is considered the best because it is the most specific.

"Interest": A request for a Content Object that specifies a HSVLI name prefix and other optional selectors to choose among multiple objects with the same name prefix. Any Content Object whose name matches the Interest name prefix and selectors satisfies the Interest.

"Content Object": A data object sent in response to an Interest. It has a HSVLI name and a Contents payload that is bound together via a cryptographic signature. Optionally, all Content Objects have an implicit terminal name component made up of the SHA-256 digest of the Content Object. In one embodiment, the implicit digest is not transfered on the wire, but is computed at each hop, if needed.

"Similarity Hash": In an Interest, the Name and several fields called Selectors limit the possible content objects that match the interest. Taken together, they uniquely identify the query in the Interest. The Similarity Hash is a hash over those fields. Two interests with the same SH are considered identical queries.

"Flatname": a CCN name organized as an ordered set of a varint (see below) length and name component bytes.

"Varint": A variable sized unsigned integer encoded, for example, as a series of 7-bit values in big-endian ordered octets. Each high-order octet bit is a continuation bit; if it is set, then the next octet is part of the value.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD." To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an Interest in a piece of content and then send that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (interest flow 150) to node 115, which does not have the content available. Next, the Interest flows (interest flow 155) from node 105 to node 125, which again does not have the content. The Interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content Hash Forwarding Hash forwarding relies on each node using the same hash function to encode name prefixes and compute similarity hashes. The hash function and its usage for Hash Forwarding is described below.

In general, a CCN packet, either for an interest or content object, has a header that includes a Similarity Hash (SH) and a Forwarding Hash (FH). SH is used to uniquely identify a piece of content, and can be a hash of the name and one or more fields in the packet. In one embodiment, SH is only computed by the source node that initiates an Interest, and optionally verified by an authoritative source node generating content or responding from a long-term repository. Any two Interests containing the same SH are considered to contain a request for the same piece of content. Any Content Object packet that contains the same SH is considered to be a correct response to the corresponding Interest. In essence, SH can be used in place of the name for purposes of identifying a piece of content.

FH is computed based on one or more components of an Interest packet's name. In general, the source node of an Interest packet may compute FH based on the highest-level hierarchy of the name components (wherein the highest hierarchy is "/"). As the Interest packet travels through the network at each forwarder, the FH may or may not be updated based on the longest match conducted at each forwarder. Every time the FH is updated, it is updated to a hash that corresponds to a more specific subset of the name components. For example, for an Interest packet with a name "/apple/pie/is/good," at the source node a packet's FH might be H{/}. As the packet is forwarded through the network, this FH can be updated to H{/apple/pie/is} and later to H{/apple/pie/is/good}. In general, the FH of a packet could become more or less specific with respect to the name components (which means the match to the name becomes "longer" or "shorter") along the data path toward the destination.

The high-level of CCN hash forwarding operates as follows. A node issues an Interest for a Content Object and receives back at most one Content Object per Interest it sends. The Content Object's name is expected to be equal to or at least match a suffix of the Interest name, and to satisfy the various selectors in the Interest. In embodiments of the present invention, the system speeds up this processing by pre-computing the SH and longest-matching prefix (LMP) FH. The assumption is that the LMP FH does not change frequently in-route, and that intermediate nodes do not need to do much expensive longest match for CCN flatnames. In particular, a forwarder does not necessarily evaluate the name or selectors when matching content in its Content Store (which serves as a cache for previously seen Content Objects). It may use exact match on the SH.

A forwarder typically maintains several data structures: The Pending Interest Table (PIT) tracks outstanding Interests the forwarder has seen, for which the forwarder is awaiting a response. It also aggregates similar Interests (Interest with the same Similarity Hash), so one Content Object may be replicated and forwarded to multiple reverse paths corresponding to multiple pending Interests. The PIT tracks the interfaces out of which an Interest has been sent and ensures that similar Interests are not sent multiple times out the same interfaces. The PIT also ensures that similar Interests can flow in all directions. A forwarder, for example, with three interfaces 1, 2 and 3, may forward an interest received from interface 1 toward interfaces 2 and 3. At a later time, it receives a similar Interest from Interface 2. It may forward that Interest out of interface 1, but not 3.

The Content Store (CS) is an optional component. It stores recently seen or high-value Content Objects so later requests for the same object can be answered without forwarding an Interest. Cache policy and retention policy can be applied.

The Forwarding Information Base (FIB) contains information indicating the Interest forwarding routes. Typically, a routing protocol is used to populate the FIB. In one embodiment, the entries in the FIB are indexed based on the Forwarding Hashes.

In general, a forwarder matches both the SH and FH of an Interest on the return path of a Content Object. This is because a malicious user could put in an SH for /popular/content and an FH for a /colluding/site, for example. The content object form /colluding/site would have malicious content, but an SH for /popular/content would be benign. If forwarders do not validate that the Content Object matches the full pending Interest with both SH and FH, and only reverse-path forwards with the SH, the malicious content could pollute the network.

To summarize the behavior of forwarding, an Interest is forwarded based on its FH. If an intermediate node has a more specific route (i.e., a forwarding entry that matches a longer portion of the name), it may update the FH to the more specific hash. When a Content Object is returned, an intermediate node will re-swap the FH label. When an intermediate node receives a Content Object, it verifies that it came from the expected direction, based on the PIT entry and SH/FH headers. An exception to this is if an Interest was routed along the default route (an empty FH), then the FH header in the Content Object is not swapped.

A PIT entry stores the SH, which is invariant in forwarding, the ingress FH, and the egress FH. The egress FH matches a Content Object's FH when it is received, and the ingress FH is label swapped to the Content Object when it is reverse-path forwarded toward the owner of the Interest. It is possible that the PIT stores multiple ingress FH's.

During operation, when a node creates an Interest, the node encapsulates the Interest in a header. It computes the Similarity Hash and places it in the header's SH field. If the node has knowledge of the proper Forwarding Hash, it places the FH in the FH field. The node then sends the Interest packet to the next-hop forwarder.

A node may obtain the FH in several ways: hash the first name component; use a directory service; use the FH returned in a Content Object from a previous Interest for the same prefix; or encode the FH in a specific link format.

When a forwarder receives an Interest on an ingress interface, it performs the following actions: The forwarder looks up the SH/FH in the PIT. If no entry exists, it creates a PIT entry for the Interest, then proceeds to check the Content Store. To create a PIT entry, the forwarder records the SH and FH of the Interest and notes the ingress port on which the Interest is received. If the remaining time of the PIT entry is less than the Interest's requested holdtime, the forwarder can extend the PIT entry's remaining time. Note that the holdtime is a suggested maximum time to hold the Interest in a PIT. The forwarder then proceeds to forward the Interest.

If a forwarder implements a Content Store, it can lookup the FH in the FIB, and determine if there is a more specific route FH' (which is an FH corresponding to a longer, or more specific, portion of the name). If not, set FH'=FH. The forwarder then matches the SH and FH' in the Content Store. If there is an exact match, the forwarder returns the Content Object and consumes the PIT entry. The returned object carries SH/FH, unless FH was the default route, in which case it carries SH/FH'. If there is no exact match in the Content Store, the forwarder forwards the Interest.

To forward the Interest, the forward first looks up the FH in the FIB and finds the longest matching prefix in the FIB, based on the name of the Interest, then forwards the Interest out those ports. The forwarder is precluded from forwarding the Interest on the port from which it is received. Call the longest matching FIB forwarding hash FH' and the set of egress interfaces E. As an example, if the FIB is a hash table, the forwarder looks up the FH as the key. If the entry exists and it has no children (meaning that there does not exist a longer match with the Interest's name), the forwarder uses that FIB entry. If the entry has one or more children, the forwarder examines the children to determine if a longer match is possible. The forwarder then removes the Interest's ingress interface from E. The forwarder further looks up the SH/FH' in the PIT. If the Interest's hop limit (as decremented above) is greater than the PIT entries "maximum hop limit", the forwarder sets the PIT entry's maximum hop limit to the Interest's hop limit, and internally marks the Interest as "hop limit extended." If the Interest is not marked as "hop limit extended," the forwarder removes any egress interfaces already used from E. In addition, the forwarder links SH/FH' to SH/FH, if they are different. This may be a one to many mapping relationship. If E is not empty, the forwarder updates the FH in the interest with the longest matching FIB hash, and then forwards the Interest.

If an end-system content producer receives an Interest, it may create a Content Object that satisfies the body of the Interest and return it along the reverse path. The returned object carries the SH/FH received in the Interest. An end system may verify that the SH is properly calculated to match the body of the Interest.

An intermediate forwarder receiving a Content Object first verifies whether the SH and FH of the received Content Object are in the PIT. If they are not, the forwarder drops the Content Object. The forwarder then verifies that the Content Object arrived from a port over which a corresponding Interest was previously forwarded, or over which the corresponding Interest could have been forwarded. If this condition is not met, the forwarder drops the Content Object.

If the forwarder implements a Content Store, the forwarder adds the object to the store if the object's holdtime permits it. Then the forwarder forwards the object along the reverse path, label swapping the object's FH to the reverse path's FH, except if the reverse path FH was the default route (empty) in which case the forwarder does not change the FH. This is done by following the links from SH/FH' to SH/FH, if any exists. Subsequently, the forwarder consumes the PIT entries satisfied by the Content Object.

An end system receiving a Content Object should verify that the Content Object actually satisfies the original Interest. It should also verify the integrity of the Content Object's hash and signature.

Figure 2:
FIG. 2 illustrates an exemplary hash-forwarding header for a CCN packet, in accordance with an embodiment of the present invention.

FIG. 2 illustrates an exemplary hash-forwarding header for a CCN packet, in accordance with an embodiment of the present invention. In this example, a CCN packet 200 includes a payload portion 208 and a hash forwarding header, which in turn can include a holdtime field 202, an FH field 204, an SH field 206. Payload portion 208 may include the full CCN content name (i.e., HSVLI), and additional fields associated with an Interest or Content Object.

Holdtime field 202 indicates the holdtime which is a suggested maximum time to hold the message at a forwarder. For an Interest, the holdtime is the desired time to keep the Interest in the PIT until a response comes. For a Content Object, the holdtime is the maximum time to keep the Content Object in the fast response cache.

In one embodiment, the Similarity Hash is only computed by the source node, and optionally verified by an authoritative source node generating content or responding from a long-term repository. The Similarity Hash can use the SHA-256 hashing algorithm.

The Forwarding Hashes can be computed in a similar way. The Forwarding Hash is used and possibly computed by forwarding nodes based on entries in their FIB table. Speed of computation is important, and collision resistance only needs to be good enough to distinguish between allowed routing names. In one embodiment, the Forwarding Hash uses FNV-1a 128-bit [FNV] with the standard FNV_offset and FNV_prime:

$$\text{FNV\_prime} = 2^{}88 + 2^{}8 + 0x3B$$
$$= 309, 485, 009, 821, 345, 068, 724, 781, 371$$
$$= 0x00000000\ 01000000\ 00000000\ 0000013B;$$

and $$\text{FNV\_offset} = 144, 066, 263, 297, 769, 815, 596,$$
$$495, 629, 677, 062, 367, 629$$
$$= 0x6C62272E\ 07BB0142\ 62B82175\ 6295C58D.$$

To compute a Forwarding Hash over a CCN name, the system can run the FNV-1a 128-bit over each name component using the flatname format, in cumulative order, to the desired number of components.

Figure 3:
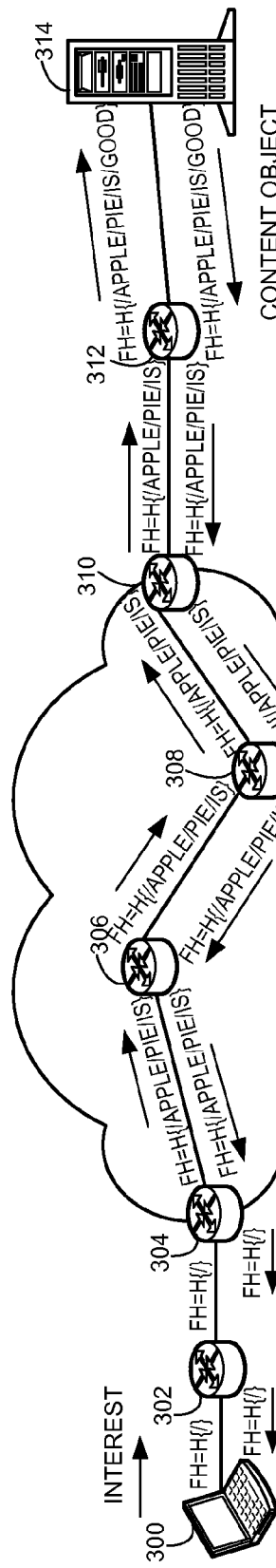
FIG. 3 illustrates the process of forwarding an Interest and a corresponding Content Object, in accordance with an embodiment of the present invention.

FIG. 3 illustrates the process of forwarding an Interest and a corresponding Content Object, in accordance with an embodiment of the present invention. In this example, a client end system 300 is coupled to a network 300 and wishes to obtain content named /apple/pie/is/good from a content server 314. A number of forwarding nodes, such as forwarders 302, 304, 306, 308, 310, and 312, couple end system 300 with content server 314. In one embodiment, these forwarders can be IP routers. In this example, forwarders 302 and 312 can be enterprise gateway routers for the respective enterprise networks associated with end system 300 and content server 314. Forwarders 304 and 310 can be edge routers providing access into core network 300 to the enterprise networks.

During operation, end system 300 initiates an Interest for /apple/pie/is/good. Assuming that end system 300 has no knowledge about how to forward the Interest packet, end system 300 forwards the Interest to the default gateway router 302, setting the Interest's FH to H{/}, that is, the FH is computed based on the highest hierarchy "/" in the HSVLI. Gateway router 302 also has no specific routing information on how to forward the Interest for /apple/pie/is/good, so it forwards it to edge router 304 with the same FH. Assuming that edge router 304 has routing information for /apple/pie/is, edge router then replaces the Interest's FH with H{/apple/pie/is}. Subsequently, core routers 306 and 308 can forward the Interest based on this updated FH through core network 300 without having to parse the full HSVLI, using an exact match of the FH in their respective FIB. When the Interest reaches edge router 310, edge router 310 forwards the Interest, based on the same FH=H{/apple/pie/is/good}, to gateway router 312, which is within the enterprise network where content server 314 resides. Since gateway router 312 has the routing information for the full HSVLI /apple/pie/is/good, gateway router 312 replaces the FH with H{/apple/pie/is/good}, and forwards the Interest to content server 314.

When content server 314 returns a Content Object, it sets the Content Object's SH to be the same SH as the Interest, and the FH to be H{/apple/pie/is/good}. Subsequently, the Content Object is reverse-path forwarded back to end system 300. At each hop, the FH of the Content Object is updated so that it matches the FH of the Interest that was previously received on the same link where the Content Object is to be forwarded. For example, at router 312, the Content Object's FH is replaced with H{/apple/pie/is}, and at edge router 304 the FH is again replaced with H{/}. This reverse-path forwarding mechanism ensures that the Content Object travels along the same data path on which the Interest has traveled, and hence can prevent any malicious entity from tampering with or spoofing the returned Content Object.

Figure 4:
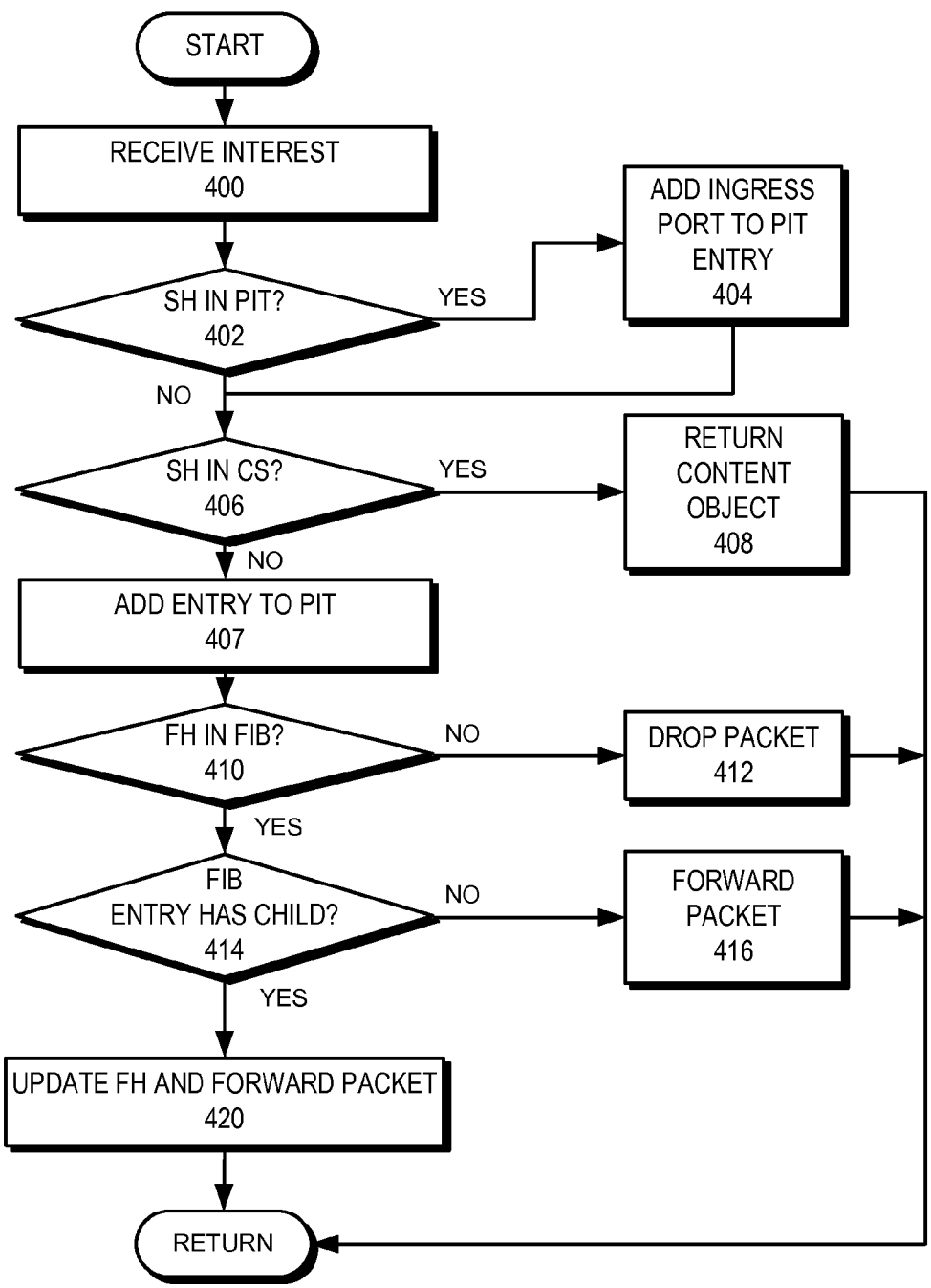
FIG. 4 presents a flow chart illustrating the process of receiving and forwarding an Interest, in accordance with an embodiment of the present invention.

FIG. 4 presents a flow chart illustrating the process of receiving and forwarding an Interest, in accordance with an embodiment of the present invention. During operation, the system receives an Interest (operation 400). The system then determines whether the SH of the Interest is in the PIT (operation 402). If so, the system adds the ingress port on which the Interest is received to the corresponding PIT entry (operation 404). Otherwise, the system further determines whether the content corresponding to the SH is in the local Content Store (operation 406). If so, the system returns the matching Content Object (operation 408). If not, the system then adds a corresponding entry to the PIT (operation 407).

Next, the system determines whether the Interest's FH is in the FIB (operation 410). If the FH is not in the FIB, the system drops the Interest packet (operation 412). If the FH is in the FIB, the system further determines whether the corresponding FIB entry has a child, which means that the FIB contains a longer prefix match than the current FH indicates (operation 414). If the FIG entry does not have a child, the system forwards the Interest packet based on the egress port indicated by the FIB entry (operation 416). If the FIB entry has a child, the system then updates the Interest packet's FH based on the longer prefix match indicated by the child by rehashing the matched prefix, and forwards the packet accordingly (operation 420).

Figure 5:
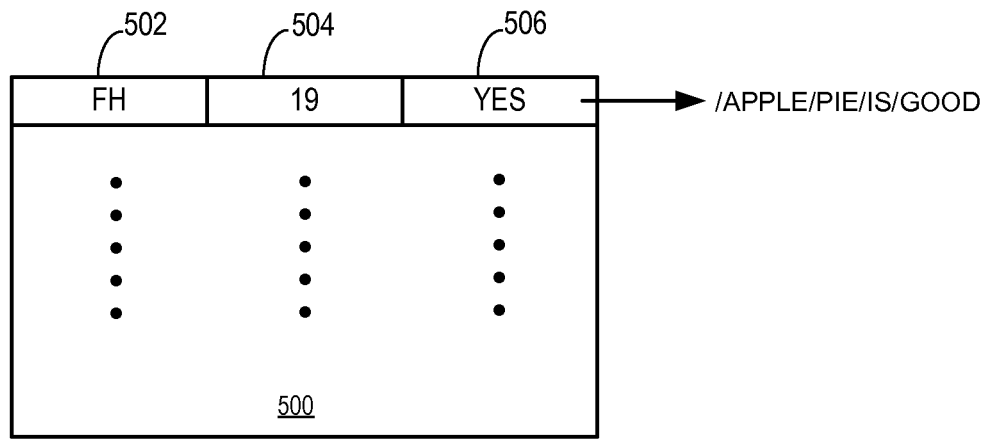
FIG. 5 illustrates an exemplary forwarding information base (FIB), in accordance with an embodiment of the present invention.

FIG. 5 illustrates an exemplary forwarding information base (FIB), in accordance with an embodiment of the present invention. In this example, a FIB 500 includes an FH column 502, an egress port(s) column 504, and a child indication column 506. FH column 502 stores the FHs for which the FIB maintains the proper forwarding (i.e., egress port(s)) information. Egress port(s) column 504 indicates one or more egress ports via which an Interest packet can be forwarded.

Child indication column 506 stores an indicator which indicates whether the forwarder has a longer prefix match for the HSVLI associated with the current FH. In one embodiment, child indication column 506 stores a pointer to the longer prefix match, based on which the system can re-compute the FH.

Figure 6:
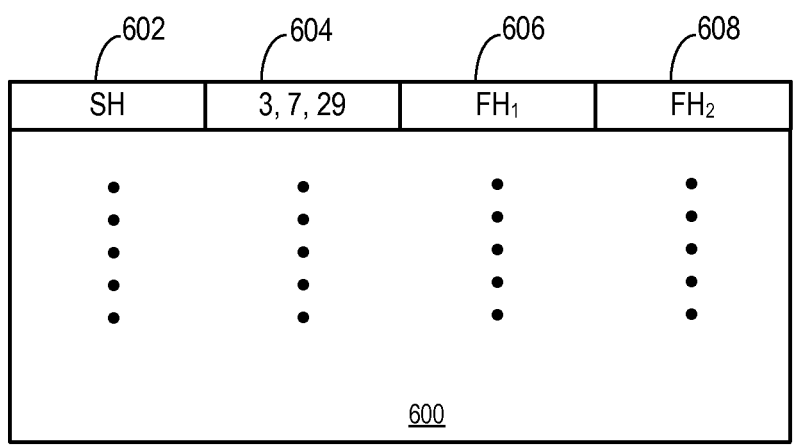
FIG. 6 illustrates an exemplary pending Interest table (PIT), in accordance with an embodiment of the present invention.

FIG. 6 illustrates an exemplary pending Interest table (PIT), in accordance with an embodiment of the present invention. In this example, a PIT 600 includes an SH column 602, an ingress port(s) column 604, an egress FH column 606, and an ingress FH column 608. SH column 602 stores the SH for a pending Interest and is used to look up an pending Interest in PIT 600. Ingress port(s) column 604 indicates one or more ingress ports on which an Interest is received. These ports will be used to send back the Content Objects corresponding to the pending Interest. Egress FH column 606 indicates the FH a corresponding received Content Object should have, which is used to confirm that the Content Object is received via the correct reverse path. Ingress FH column 608 indicates the new FH that should be used to update the old FH of a received Content Object. Note that the terms "egress" and "ingress" are used here with reference to the corresponding Interest, not the Content Object.

Figure 7:
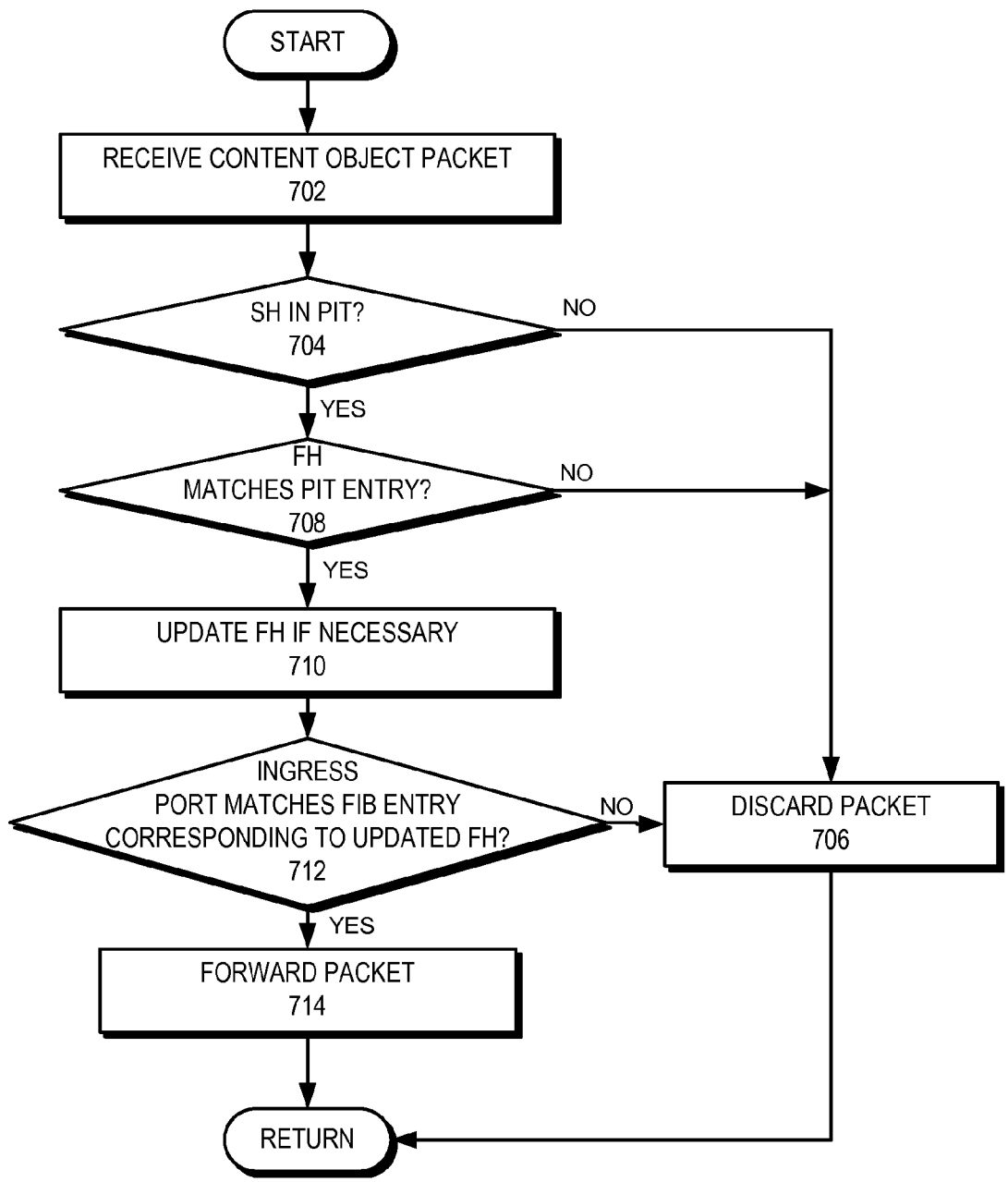
FIG. 7 presents a flow chart illustrating an exemplary process of receiving and forwarding a Content Object, in accordance with an embodiment of the present invention.

FIG. 7 presents a flow chart illustrating an exemplary process of receiving and forwarding a Content Object, in accordance with an embodiment of the present invention. During operation, the system first receives a Content Object packet (operation 702). The system then determines whether the SH of the Content Object is in the PIT (operation 704). If it is not in the PIT, the system discards the packet (operation 706). Otherwise, the system further determines whether the FH in the Content Object matches the egress FH (corresponding to egress FH column 606 in FIG. 6) in the corresponding PIT entry (operation 708). If not, the system discards the packet (operation 706). Otherwise, the system updates the Content Object's FH, if the corresponding PIT entry indicates that a different FH should be used for the Content Object before it is sent out (corresponding to ingress FH column 608 in FIG. 6) (operation 710).

Subsequently, the system determines whether the ingress port on which the Content Object is received matches the FIB entry corresponding to the updated FH (operation 712). If not, the system discards the packet (operation 706). Otherwise, the system forwards the Content Object packet to the ports indicated by the PIT entry (corresponding to ingress port(s) column 604 in FIG. 6) (operation 714).

Figure 8:
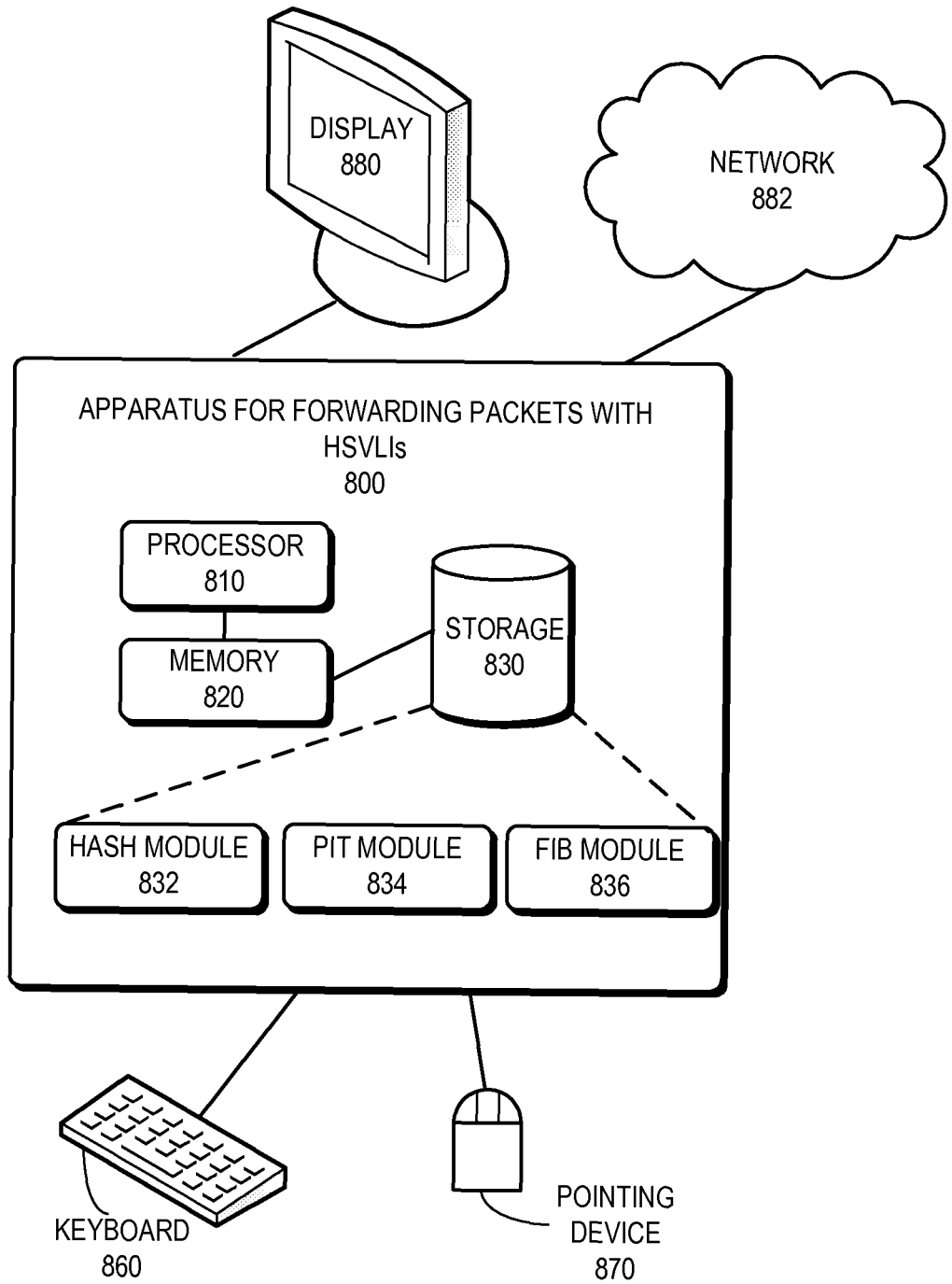
FIG. 8 illustrates an exemplary system for forwarding packets with HSVLIs, in accordance with an embodiment.

FIG. 8 illustrates an exemplary system for forwarding packets with HSVLIs, in accordance with an embodiment. A system 800 for forwarding packets with HSVLIs comprises a processor 810, a memory 820, and a storage 830. Storage 830 typically stores instructions which can be loaded into memory 820 and executed by processor 810 to perform the hash-forwarding methods mentioned above. In one embodiment, the instructions in storage 830 can implement a hash module 832, a PIT module 834, and a FIB module 836, all of which can be in communication with each other through various means.

In some embodiments, modules 832, 834, and 836 can be partially or entirely implemented in hardware and can be part of processor 810. Further, in some embodiments, the system may not include a separate processor and memory. Instead, in addition to performing their specific tasks, modules 832, 834, and 836, either separately or in concert, may be part of general- or special-purpose computation engines.

Storage 830 stores programs to be executed by processor 810. Specifically, storage 830 stores a program that implements a system (application) for performing hash-based forwarding of packets with HSVLIs. During operation, the application program can be loaded from storage 830 into memory 820 and executed by processor 810. As a result, system 800 can perform the functions described above. System 800 can be coupled to an optional display 880, keyboard 860, and pointing device 870, and also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for forwarding packets with hierarchically structured variable-length identifiers (HSVLIs), the method comprising:
    receiving, at a packet-forwarding device in a content-centric network, a packet with an HSVLI comprising contiguous name components ordered from a most general level to a most specific level, wherein the packet includes at least a first hash value and a second hash value that are different from the name components;
    extracting the first hash value and the second hash value from the received packet, wherein the first hash value and the second hash value are generated by one or more devices separate from the packet-forwarding device, wherein the first hash value uniquely represents an Interest corresponding to the HSVLI, and wherein the second hash value is derived based on at least a subset of the name components of the HSVLI; and
    making a forwarding decision for the packet based on the first hash value and the second hash value extracted from the packet.

2. The method of claim 1, wherein the packet is an Interest in a piece of content corresponding to the HSVLI;
    wherein the first hash value is a hash derived based on the entire HSVLI and optionally additional information in the packet;
    wherein the second hash value is a hash derived on the subset of the HSVLI components; and
    wherein the method further comprises updating the second hash value based on a longer prefix match for the HSVLI.

3. The method of claim 1, wherein the packet contains a content object in response to an Interest in the content.

4. The method of claim 1, further comprising maintaining a pending Interest table, wherein a respective entry in the pending Interest table indicates a pending Interest associated with the first hash value and optionally the second hash value.

5. The method of claim 1, further comprising maintaining a forwarding information base, wherein a respective entry in the forwarding information base indicates forwarding information for a packet that contains a particular second value.

6. The method of claim 5, wherein the entry in the forwarding information base further indicates that a longer prefix match exists for the HSVLI.

7. The method of claim 1, wherein the packet is an Interest in the piece of content; and
    wherein the method further comprises searching a local content store for content corresponding to the Interest based on the first hash value and optionally the second hash value.

8. The method of claim 1, wherein the packet contains a content object in response to an Interest in a piece of content corresponding to the HSVLI; and
    wherein the method further comprises updating the second hash value for the packet based on a second hash value of a corresponding Interest packet that is previously received.

9. An system for forwarding packets with hierarchically structured variable-length identifiers (HSVLIs), the system comprising:
    a processor; and
    a storage device coupled to the processor and storing instructions which when executed by the processor cause the processor to perform a method, the method comprising:
    receiving, at a packet-forwarding device in a content-centric network, a packet with an HSVLI comprising contiguous name components ordered from a most general level to a most specific level, wherein the packet includes at least a first hash value and a second hash value that are different from the name components;
    extracting the first hash value and the second hash value from the received packet, wherein the first hash value and the second hash value are generated by one or more devices separate from the packet-forwarding device, wherein the first hash value uniquely represents an Interest corresponding to the HSVLI, and wherein the second hash value is derived based on at least a subset of name components of the HSVLI; and
    making a forwarding decision for the packet based on the first hash value and the second hash value extracted from the packet.

10. The system of claim 9, wherein the packet is an Interest in a piece of content corresponding to the HSVLI;
    wherein the first hash value is a hash derived based on the entire HSVLI and optionally additional information in the packet;
    wherein the second hash value is a hash derived on the subset of the HSVLI components; and wherein the method further comprises updating the second hash value based on a longer prefix match for the HSVLI.

11. The system of claim 9, wherein the packet contains a content object in response to an Interest in the content.

12. The system of claim 9, wherein the method further comprises maintaining a pending Interest table, wherein a respective entry in the pending Interest table indicates a pending Interest associated with the first hash value and optionally the second hash value.

13. The system of claim 9, wherein the method further comprises maintaining a forwarding information base, wherein a respective entry in the forwarding information base indicates forwarding information for a packet that contains a particular second value.

14. The system of claim 13, wherein the entry in the forwarding information base further indicates that a longer prefix match exists for the HSVLI.

15. The system of claim 9, wherein the packet is an Interest in the piece of content; and
wherein the method further comprises searching a local content store for content corresponding to the Interest based on the first hash value and optionally the second hash value.

16. The system of claim 9, wherein the packet contains a content object in response to an Interest in a piece of content corresponding to the HSVLI; and
wherein the method further comprises updating the second hash value for the packet based on a second hash value of a corresponding Interest packet that is previously received.

17. A computer-readable storage device storing instructions that when executed by a computer cause the computer to perform a method for forwarding packets with hierarchically structured variable-length identifiers (HSVLIs), the method comprising:
receiving, at a packet-forwarding device in a content-centric network, a packet with an HSVLI comprising contiguous name components ordered from a most general level to a most specific level, wherein the packet includes at least a first hash value and a second hash value that are different from the name components;
extracting the first hash value and the second hash value from the received packet, wherein the first hash value and the second hash value are generated by one or more devices separate from the packet-forwarding device, wherein the first hash value uniquely represents an Interest corresponding to the HSVLI, and wherein the second hash value is derived based on at least a subset of the name components of the HSVLI; and
making a forwarding decision for the packet based on the first hash value and the second hash value extracted from the packet.

18. The device of claim 17, wherein the packet is an Interest in a piece of content corresponding to the HSVLI;
wherein the first hash value is a hash derived based on the entire HSVLI and optionally additional information in the packet;
wherein the second hash value is a hash derived on the subset of the HSVLI components; and
wherein the method further comprises updating the second hash value based on a longer prefix match for the HSVLI.

19. The device of claim 18, wherein the packet contains a content object in response to an Interest in the content.

20. The device of claim 18, wherein the method further comprises maintaining a pending Interest table, wherein a respective entry in the pending Interest table indicates a pending Interest associated with the first hash value and optionally the second hash value.

21. The device of claim 18, wherein the method further comprises maintaining a forwarding information base, wherein a respective entry in the forwarding information base indicates forwarding information for a packet that contains a particular second value.

22. The device of claim 21, wherein the entry in the forwarding information base further indicates that a longer prefix match exists for the HSVLI.

23. The device of claim 17, wherein the packet is an Interest in the piece of content; and
wherein the method further comprises searching a local content store for content corresponding to the Interest based on the first hash value and optionally the second hash value.

24. The device of claim 17, wherein the packet contains a content object in response to an Interest in the content; and
wherein the method further comprises updating the second hash value for the packet based on a second hash value of corresponding Interest packet that is previously received.

* * * * *